Sept. 15, 1925.
L. RYAN
WATER FILTERING PLANT
Filed Dec. 12, 1922
1,554,129
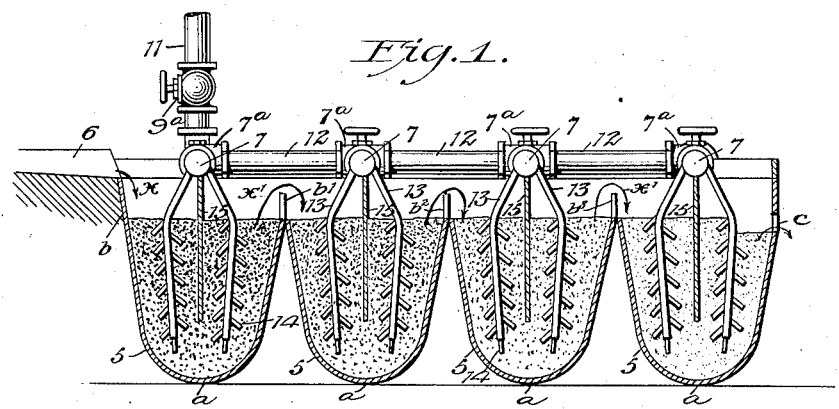
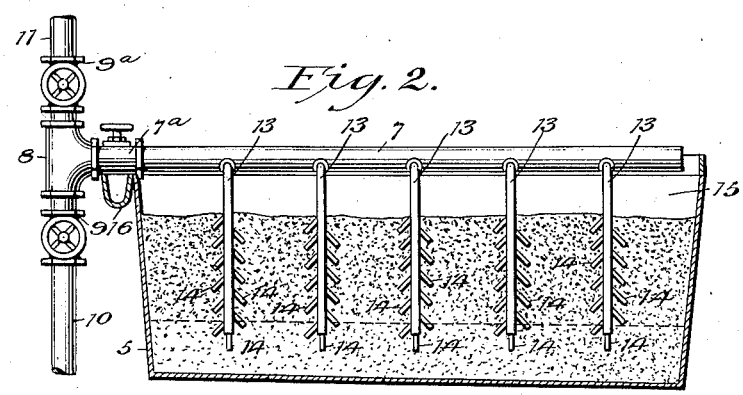
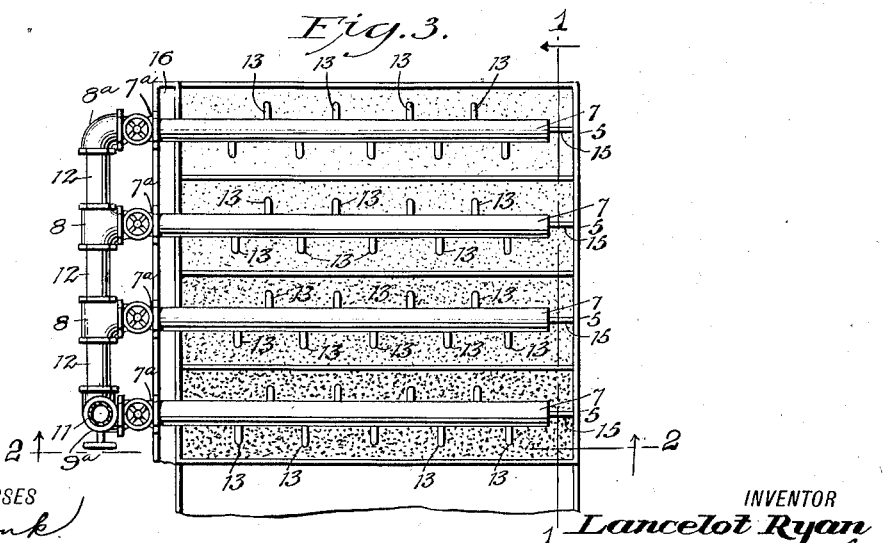
WITNESSES
INVENTOR
Lancelot Ryan
BY
ATTORNEYS Patented Sept. 15, 1925.

1,554,129

UNITED STATES PATENT OFFICE.

LANCELOT RYAN, OF ST. LOUIS, MISSOURI.

WATER-FILTERING PLANT.

Application filed December 12, 1922. Serial No. 606,424.

*To all whom it may concern:*

Be it known that I, LANCELOT RYAN, a citizen of the United States of America, and a resident of the city of St. Louis, and State of Missouri, have invented a new and Improved Water-Filtering Plant, of which the following is a description.

This invention has for its object to provide a novel water filtering plant having novel means whereby to afford an extensive area for contact of filtering sand with the water that is to be purified by passing therethrough, and that provides convenient and practical means for removing impurities from the filtering agent by the use of steam and water, whereby to cleanse the sand for renewed service, from time to time, as may become necessary.

The invention consists in the novel construction and combination of parts, as is hereinafter described and defined in the appended claims.

Reference is to be had to the accompanying drawings forming a part of this specification, it being understood that the drawings are merely illustrative of a practical example of the invention.

Figure 1 is a transverse sectional view of details, substantially on the line 1—1 in Figure 3;

Figure 2 is a longitudinal sectional view substantially on the line 2—2 in Figure 3; and Figure 3 is a plan view of a portion of the filtering plant.

In a suitable frame or other support a series of elongated troughs or hoppers 5 are held, parallel with each other, having adjacent side edges in contact and all occupying the same horizontal plane. Preferably the hoppers 5 are curved on their bottom surfaces, so as to render their bottom walls concavo-convex in cross section, and from these bottom walls $a$ the integral side walls of the hoppers project upward and flare outward a suitable degree, as is clearly shown in Figure 1. Any preferred number of the similar hoppers 5 are employed, and their holding capacity, as well as their number, should be determined by the quantity of water to be filtered in a given time.

At the outer side of the hopper 5 that is nearest to the water supply, the side wall $b$ is projected upward above the plane of the upper edges of the hoppers, and an intake or conduit 6 for water is arranged in connection with said side wall, so that the water to be filtered may be freely conveyed therefrom into the first hopper of the series, as is indicated by the curved arrow $x$ in Figure 1.

The opposite side wall of the hopper 5 that is adapted to receive water from the conduit 6, is elevated a suitable degree above the contacting side wall of the hopper next in sequence, as shown at $b'$, in Figure 1, and in a like manner the opposite side wall $b^2$, on the second hopper is raised above the adjacent side wall of the third hopper of the series from the water supply, and preferably the opposite side wall of the third hopper 5 is raised a proper distance as at $b^3$ above the contiguous upper edge of the fourth hopper; this detail of construction being continued throughout a series of hoppers without regard to their number.

A number of flush pipes 7 are provided which respectively extend above the transverse center and nearly throughout the length of each hopper 5, and at like ends of each flush pipe a valve $7^a$, is connected therewith by one end of the valve casing. A T-shaped connection, 8, is joined to the other end of each valve $7^a$, and for one valve is arranged so as to dispose the branches of the T-shaped connection in an upright plane.

On the upright branches of the T connection designated, two similar valves 9, $9^a$ are secured, and from said valves respectively extend a water supply pipe 10, and a steam supply pipe 11, that are shown broken away but in complete condition are extended respectively to a source of water and steam under proper pressure. The remaining T-shaped connections 8 are so disposed that their lateral branches will all be located horizontally in the same axial plane, and adjacent branches thereof are connected together with a short pipe 12.

Between the valve $7^a$ that is on the flush pipe 7 above the hopper 5, which is farthest from the water supply 6, and the pipe connection 12, that is nearest to said valve, an elbow connection, $8^a$, is introduced and thereon secured, which completes the connections between the steam and water supply pipes 11, 10 and the flush pipes 7, so that either steam or water may be introduced therein under pressure.

Each flush pipe is closed at the end which is farthest from a respective valve $7^a$ but from the wall of each flush pipe two series of branch pipes, 13, project outward and downward, these two sets of pipes 13 being spaced apart from each other, and preferably are disposed in staggered order, so that the pipes in one series are respectively arranged in the spaces between the pipes in the other series, but in different planes.

On each depending branch pipe 13, a series of jet nozzles 14, are arranged to project outward and downward, preferably in spiral order, and a like nozzle is formed or secured on the lower end of each branch pipe 13, and it will be evident, that steam or water supplied to the flush pipes 7, will escape with force from the jet nozzles, and project currents of the fluid or liquid in all directions therefrom.

Directly below, and near each of the flush pipes 7, a partition wall 15, is supported by any suitable means. These vertically disposed partition walls that divide the upper main portion of each hopper into two compartments, do not extend to the bottoms of the same, but at their free lower edges, are spaced a suitable distance from the inner concave surfaces of the hopper bottoms, so that the lower portions of the hoppers form two compartments in each hopper.

At one end of the laterally contacting hoppers 5, a gutter 16 is secured, which receives overflow water and conveys it away to a selected point of discharge, the gutter being shown broken away, in complete condition being extended a proper length for effective service.

In the installation of the improved water filtering plant, clean sand of different degrees of fineness is employed, and to properly arrange the apparatus for effective service, sand of coarse grain is placed in the hopper 5, that is nearest to the water supply conduit 6. In the hopper next in series a slightly finer grade of sand is placed, in the next one a still finer quality of sand is held, and in the last hopper of the series shown, the sand is of very fine grain.

In operation, water that is to be purified by removal of material impurities, is introduced in proper volume from the conduit 6, into the first or adjacent hopper 5. The inducted liquid passes down through the coarse sand in the first sub-division of the hopper, and beneath the lower edge of the partition wall 15 therein, rising through the sand in the opposite compartment, and thence passing out of the hopper over the top extension of the side wall $b'$ as indicated by the curved arrow $x'$ in Figure 1.

The water that passes from the first hopper 5, into the second one that is next in series, sinks through the sand in the nearest compartment of said hopper, passes beneath the lower edge of the partition wall 15, and over the side wall $b^2$ of the second compartment in the second hopper into the nearest compartment of the third hopper 5.

In a like manner, the now partially purified water, passes down in the first compartment in the third hopper 5, then up at the other side of the partition wall in the hopper, and from the third hopper passes into the upper portion of the fourth hopper 5, that in this example of the improved filtering apparatus is the last one of the series.

After the water by gravity has passed down into the receiving portion of the fourth hopper 5, and beneath the partition 15 therein, it will by conformity with the natural law of water seeking a common level, flow out of a discharge opening $c$, that is formed in the side wall of the fourth hopper that is farthest from the intake conduit 6, and is slightly lower than the other side walls of said hopper.

The gradual passage of water continuously through the several hoppers 5, and the sand therein, and the graduation of the sand for fineness that is employed as a filtering agent insures the elimination of all material impurities.

The continued service of the filtering plant will cause an accumulation of impurity in the sand used as a filtering medium, and at a proper time the inflow of water should be stopped, and the sand be purified as follows:

The water supply pipe, 10, is opened by a proper adjustment of the valve 9, so that water under pressure will spray from the jet nozzles 14, so as to forcibly pervade the body of sand in each hopper 5, and as at this time the escape opening $c$ is closed, the foul water will rise in all the hoppers and flow out of them into the gutter 16, and be conveyed therethrough to a point of discharge.

After a thorough washing of the sand with clean water is thus effected, the water supply valve 9, is closed, and the valve $9^a$, that controls the introduction of steam under pressure through the steam pipe 11 into the flush pipes 7, is opened.

The steam like the water previously used, will thoroughly saturate the sand in all the hoppers, and sterilize the sand by killing any disease germs that may be deposited therein. Upon shutting the valve $9^a$ steam will be cut off from the flush pipes 7, and the renovated filtering apparatus may be again put into use.

It will be seen that it requires no labor, and but a short period of time to thoroughly cleanse and sterilize the sand used in the filtering apparatus, so that but one plant will afford a practically continuous supply of purified water where the improvement is installed.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a water filtering plant, the combination with a series of oblong hoppers, having their side edges parallel and contacting, a vertical partition in each hopper extending part way toward the bottom of the hopper, a sand filling in each hopper, a water intake at one outside hopper and a water discharge formed in the other outside hopper, of a sand washing and sterilizing device, comprising a series of flush pipes, two series of branch pipes having spray nozzles thereon, and depending from each flush pipe respectively at the opposite sides of the partition wall, and means for successively supplying water and steam to the flush pipes for washing and sterilizing the sand.

2. A filtering means including a series of containers adapted to hold filtering material, means to direct the water to be filtered to one of the containers, said containers having central vertical partitions arranged for water to flow downward and then upward in each of the containers and thus cause the water to flow through the successive containers from the receiving container, the final container of the series having an outlet; together with individual means in each container at each side of the partition adapted to direct cleaning water into the filtering material therein.

3. A filtering means including a series of containers adapted to hold filtering material, means to direct the water to be filtered to one of the containers, said containers being arranged for water to flow through the successive containers from the receiving container, the final container of the series having an outlet; together with a vertical baffle in each container terminating short of the bottom thereof, individual pipes in each container at both sides of said partition to direct fluid into the filtering material in the container, and means to supply water or steam to said water pipes.

LANCELOT RYAN.